(12) United States Patent
Kouwa et al.

(10) Patent No.: US 7,173,398 B2
(45) Date of Patent: Feb. 6, 2007

(54) SYSTEM FOR CONTROLLING A VEHICULAR GENERATOR

(75) Inventors: Tatsuki Kouwa, Tokyo (JP); Yoshihito Itou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/531,993

(22) PCT Filed: Oct. 10, 2003

(86) PCT No.: PCT/JP03/13072

§ 371 (c)(1),
(2), (4) Date: Nov. 23, 2005

(87) PCT Pub. No.: WO2005/036729

PCT Pub. Date: Apr. 21, 2005

(65) Prior Publication Data

US 2006/0145669 A1 Jul. 6, 2006

(51) Int. Cl.
*H02P 9/04* (2006.01)
(52) U.S. Cl. .................. 322/8; 322/12; 290/8
(58) Field of Classification Search .......... 322/12, 322/8; 290/8
See application file for complete search history.

(56) References Cited

U.S. PATENT DOCUMENTS

| | | | | |
|---|---|---|---|---|
| 4,336,487 A | * | 6/1982 | Tanaka et al. | 322/99 |
| 4,379,990 A | * | 4/1983 | Sievers et al. | 322/99 |
| 4,618,811 A | * | 10/1986 | Mashino et al. | 322/28 |
| 5,243,270 A | * | 9/1993 | Mayumi et al. | 322/28 |
| 5,719,487 A | * | 2/1998 | Sato et al. | 322/28 |
| 6,486,634 B2 | * | 11/2002 | Kokubun et al. | 320/104 |
| 6,850,042 B2 | * | 2/2005 | Kouwa | 322/24 |
| 6,936,996 B2 | * | 8/2005 | Uematsu et al. | 322/99 |

FOREIGN PATENT DOCUMENTS

| | | | |
|---|---|---|---|
| JP | 59-213239 A | | 12/1984 |
| JP | 59213239 A | * | 12/1984 |
| JP | 61-58435 A | | 3/1986 |
| JP | 61058435 A | * | 3/1986 |
| JP | 1-259732 A | | 10/1989 |
| JP | 01259732 A | * | 10/1989 |
| JP | 3102981 B2 | | 7/1995 |
| JP | 09140196 A | * | 5/1997 |

OTHER PUBLICATIONS

International Search Report for PCT/JP03/13072 dated Jan. 20, 2004.

* cited by examiner

*Primary Examiner*—Joseph Waks
(74) *Attorney, Agent, or Firm*—Sughrue Mion, PLLC

(57) ABSTRACT

A system for controlling a vehicular generator, includes: a voltage controlling device 1 for adjusting a generator output voltage of a generator 10 connected to an in-vehicle battery 4 to a predetermined voltage, the voltage controlling device 1 including an external voltage sensing terminal S for detecting an external voltage of the generator 10, and the generator output voltage being adjusted through on/off control of a field current of the generator 10 in accordance with the external voltage, in which an external control unit 5 is inserted between the external voltage sensing terminal S and the battery 4 to cause a voltage drop. Consequently, it is possible to dispense with an exclusive input terminal for external signal, thereby enabling simple system configuration cost reduction.

6 Claims, 3 Drawing Sheets

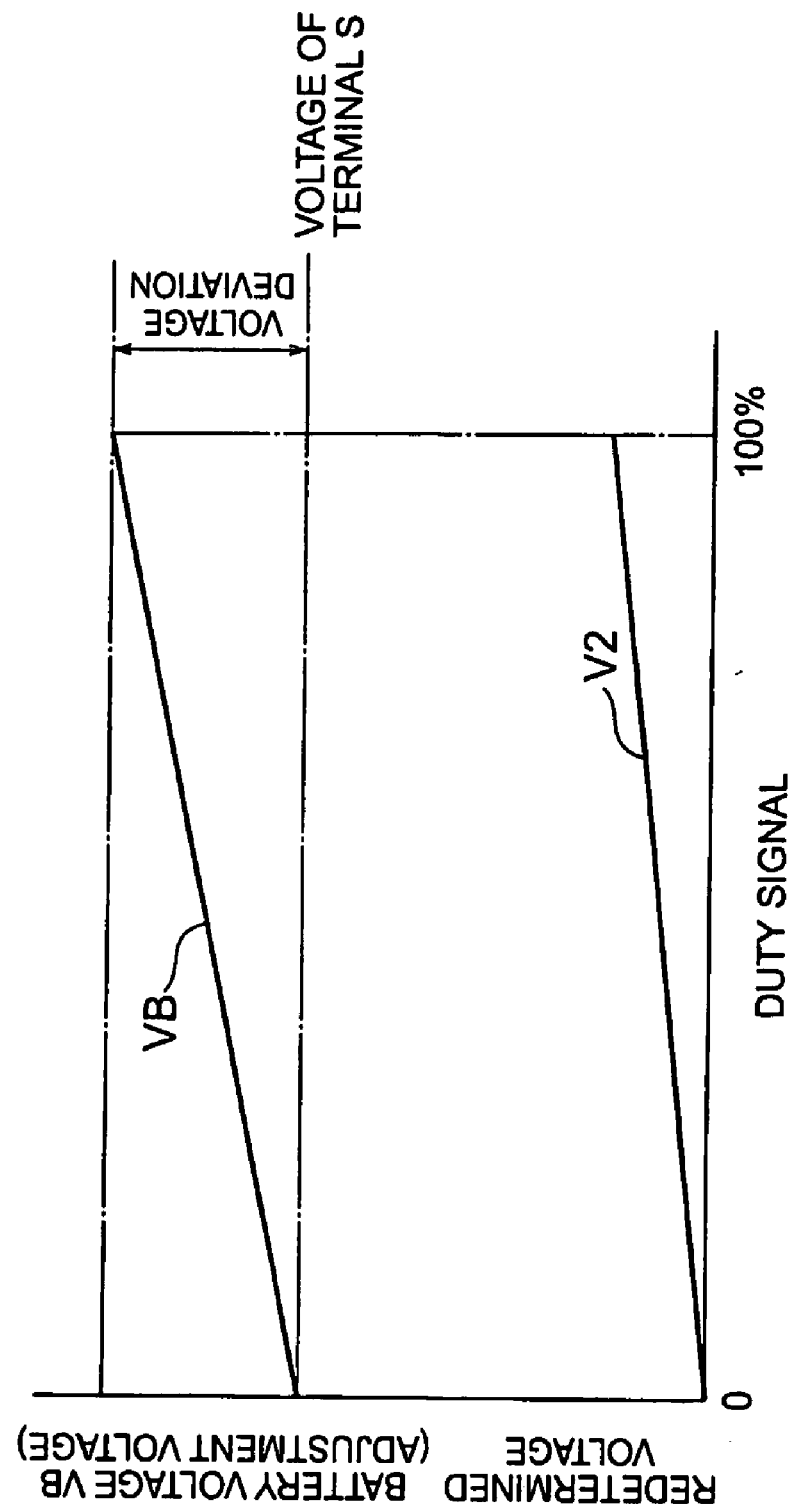

SYSTEM FOR CONTROLLING A VEHICULAR GENERATOR

TECHNICAL FIELD

The present invention relates to a system for controlling a vehicular AC generator provided with a voltage controlling device having an external voltage sensing terminal, and more particularly to a system for controlling a vehicular generator which requires no exclusive input terminal for an external signal, thereby simplifying system configuration and achieving cost reduction.

BACKGROUND ART

In general, a system for controlling a vehiclular generator includes a voltage controlling device having an external voltage sensing terminal. When a key switch of a vehicle is closed, a power transistor is made conductive by flowing of a base current, resulting in a field current flowing through a field coil, thereby enabling an AC generator (referred to as simply "generator" hereinafter) to output a generator voltage. Further, a constant-voltage power supply is produced from a battery voltage and a reference voltage is generated by the constant-voltage power source.

When the generator starts to generate electric power due to starting of an in-vehicle engine, the voltage controlling device operates so that the battery voltage to be detected by the external voltage sensing terminal exceeds the reference voltage to make a transistor 103 conductive and to turn off a power transistor 101, whereby the field current reduces and the generator output voltage of the generator lowers. In addition, when the battery voltage becomes lower, the power transistor is made conductive, and therefore the field current increases to raise the generator output voltage of the generator.

Furthermore, for example, Japanese Pat. No. 3102981 discloses a technology that an adjustment voltage varies in accordance with a duty signal from an external control unit related to a voltage controlling device.

DISCLOSURE OF THE INVENTION

Since a conventional system for controlling a vehiclular generator is configured as described above, there arises a problem in that an exclusive input terminal for an external signal needs to be provided in a voltage controlling device, thereby increasing the number of wirings for the voltage controlling device and causing cost increase.

There arises another problem in that, although the voltage controlling device is configured such that a control voltage is adjustable as desired, a circuit for determining an external input signal in the voltage controlling device is required, and therefore the configuration of the voltage controlling device becomes very complicated and still causes cost increase.

The present invention, which has been made to solve the above-mentioned problems, has an object to provide a system for controlling a vehiclular generator which requires no exclusive input terminal for an external signal, thereby simplifying system configuration and achieving cost reduction.

BRIEF DESCRIPTION OF THE DRAWINGS

FIG. 3 is a diagram for explaining an example of duty-voltage conversion in an external control unit according to Embodiment 1 of the present invention.

BEST MODE FOR CARRYING OUT THE INVENTION

Hereinafter, Embodiment 1 of the present invention will be described with reference to the drawings.

Figure 1:
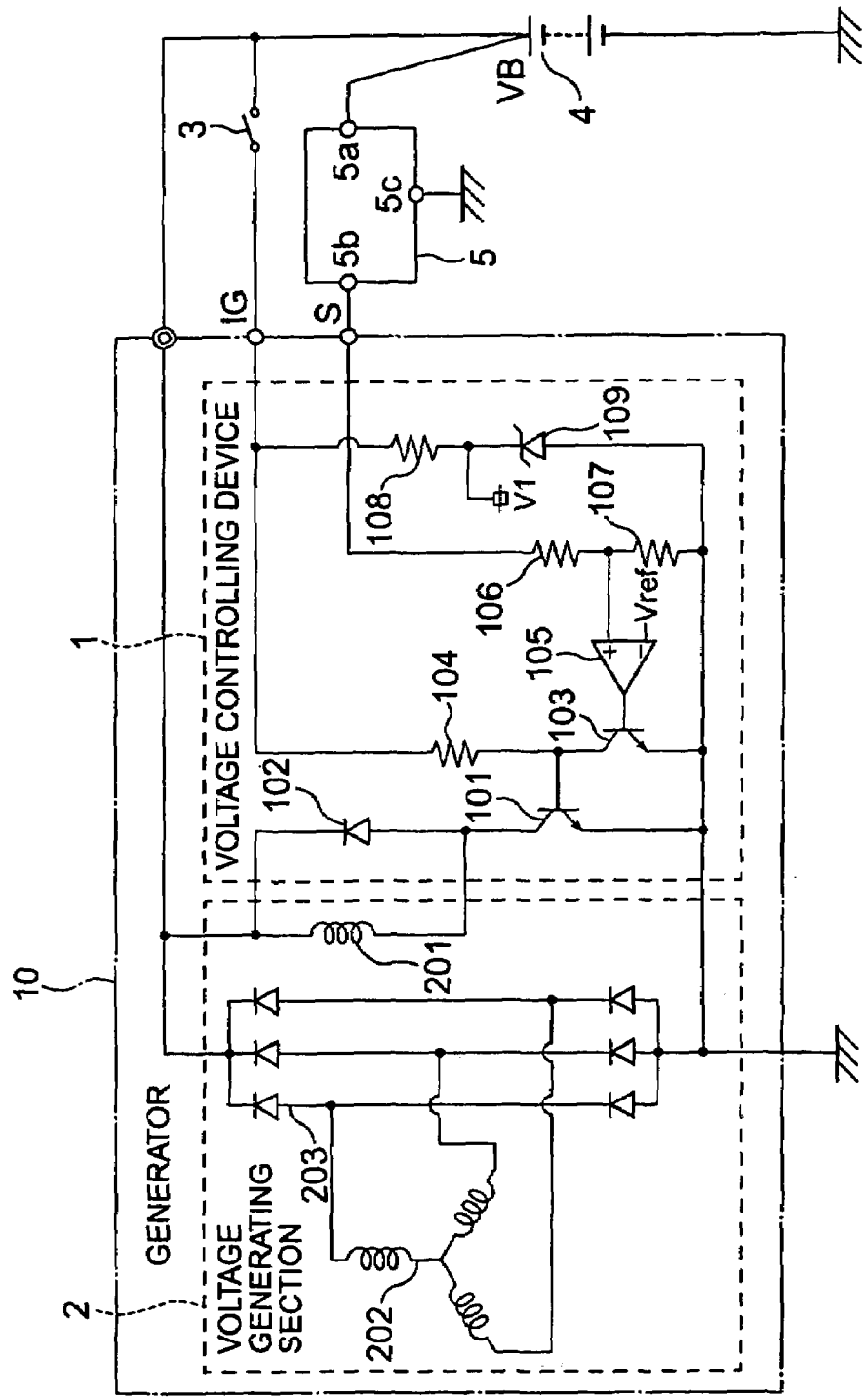
FIG. 1 is a circuit diagram showing a system for controlling a vehiclular generator according to Embodiment 1 of the present invention.

In FIG. 1, a generator (alternator) 10 is composed of a voltage controlling device 1 and a voltage generating section 2.

The voltage controlling device 1 includes a generator controller driving terminal IG and an external voltage sensing terminal S. An output terminal of a battery 4 is connected to the generator controller driving terminal IG through a key switch 3 and an output terminal of the battery 4 is connected to the external voltage sensing terminal S through an external control unit 5.

The voltage controlling device 1 includes a power transistor 101 constituting a control output circuit, a diode connected in inverse polarity to a collector terminal of the power transistor 101, a transistor 103 connected to a base terminal of the power transistor 101, a resistor 104 connected to a collector terminal of the transistor 103, a comparator 105 connected to a base terminal of the transistor 103, voltage dividing resistors 106 and 107 connected to a non-inversion input terminal (+) of the comparator 105, and a resistor 108 and a Zener diode 109 for generating a constant-voltage power source V1.

One ends of the resistors 104 and 108 are connected to the generator controller driving terminal IG and one end of the resistor 106 is connected to the external voltage sensing terminal S. Further, a reference voltage Vref is applied to an inversion input terminal (−) of the comparator 105.

The voltage generating section 2 in the generator 10 includes a field coil 201 on a rotor side connected between the output terminal of the battery 4 and the collector terminal of the power transistor 101, three-phase windings 202 on a stator side, and rectifying circuits 203 for rectifying all waves of respective generator output voltages from the three-phase windings 202. Output terminals of the rectifying circuits 203 are connected to the output terminal of the battery 4.

In FIG. 1, the voltage controlling device is different from a conventional device exclusively in that the external control unit 5 for inducing a voltage drop between the external voltage sensing terminal S of the voltage controlling device 1 and the battery 4.

Hereinafter, a basic operation of the voltage controlling device 1 shown in FIG. 1 will be described.

When the key switch 3 is closed (turned on) upon vehicle starting, a base current is supplied from the battery 4 through the resistor 104 to the power transistor 101, so the power transistor 101 is made conductive, resulting in the field current flowing through the field coil 201 to thereby enable the generator 10 to generate electric power.

In addition, a battery voltage VB is applied to the cathode of the Zener diode 109 from the battery 4 through the resistor 108, and thus a constant-voltage power source V1 is generated.

Further, a reference voltage Vref with respect to the comparator 105 is generated based on the constant-voltage power source V1.

When the generator 10 starts to generate electric power due to starting of the engine, the voltage controlling device 1 detects an input voltage (corresponding to the battery voltage VB) from the external voltage sensing terminal S and inputs it to the comparator 105 through the voltage dividing resistors 106 and 107.

When the inputted voltage thus detected becomes higher than the predetermined reference voltage Vref, the comparator 105 raises the output voltage to a high-level.

This causes the transistor 103 to be made conductive to cut off the power transistor 101, whereby the field current flowing into the field coil 201 is reduced to lower the generator output voltage from the generator 10.

On the other hand, when the detected voltage becomes lower than the reference voltage Vref due to lowering of the battery voltage VB, the comparator 105 decreases the output voltage to a low-level.

This causes the transistor 103 to be cut off and the power transistor 101 to be made conductive, whereby the field current is increased to raise the generator output voltage of the generator 10.

As described above, the generator output voltage of the generator 10 is adjusted to be an appropriate voltage in accordance with the reference voltage Vref by the voltage controlling device 1.

Next, with reference to FIGS. 1 and 2, the external control unit 5 will be described.

Figure 2:
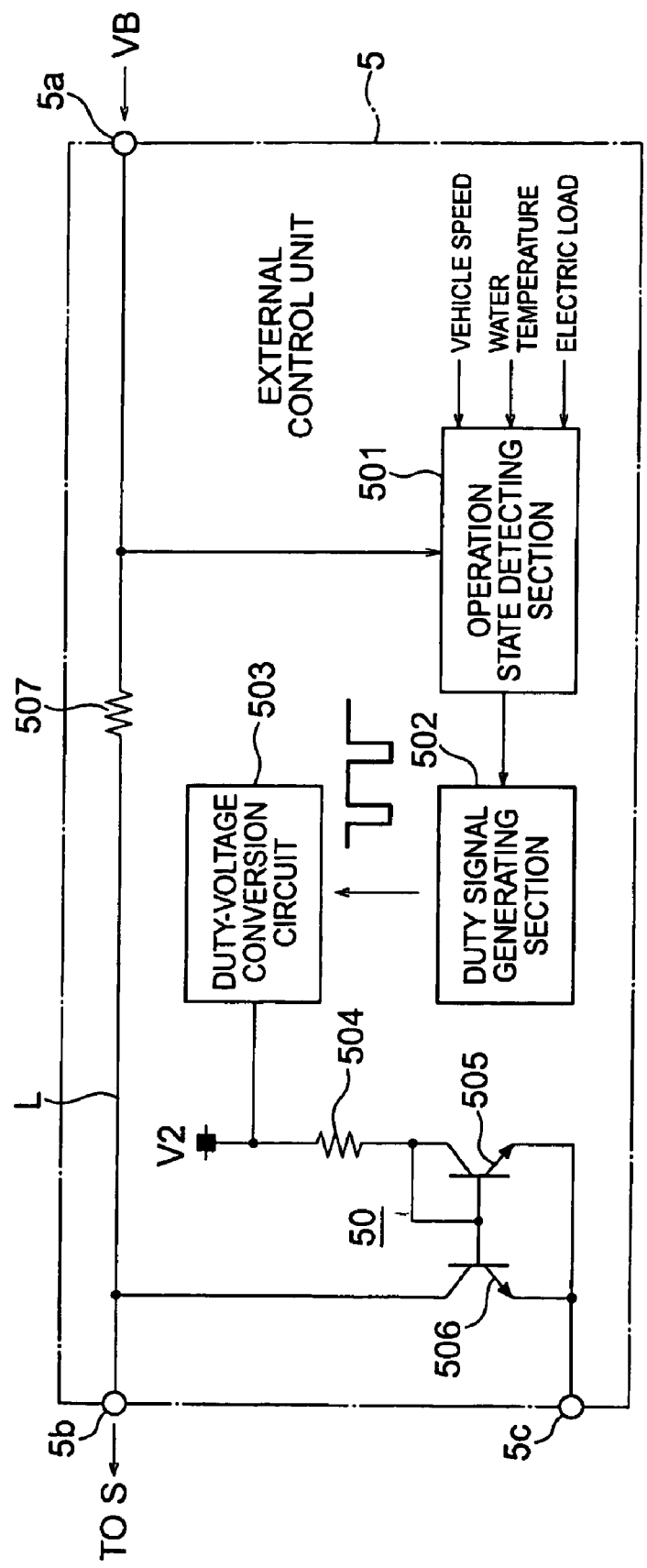
FIG. 2 is a block diagram showing a specific example of an external control unit according to Embodiment 1 of the present invention.

FIG. 2 is a block diagram showing a specific example of the external control unit 5.

In FIG. 2, the external control unit 5 includes an input terminal 5a connected to the battery 4, an output terminal 5b connected to the external voltage sensing terminal S, a ground terminal 5c grounded, an operation state detecting section 501 for detecting an operation state of a vehicle, a duty signal generating section 502 for generating a duty signal set variable in accordance with the operation state, a duty-voltage conversion circuit 503 for converting the duty signal to a predetermined voltage, a current mirror circuit 50 connected to a line L between the input terminal 5a and the output terminal 5b, and a resistor 507 inserted in the line L.

The current mirror circuit 50 is composed of a resistor 504 to which a predetermined voltage V2 outputted from the duty-voltage conversion circuit 503 is applied and a pair of transistors 505 and 506 whose emitter terminals are grounded.

One transistor, the transistor 505 is inserted between the resistor 504 and the ground terminal 5c and the other transistor, the transistor 506 is inserted between the line L and the ground terminal 5c; respective base terminals of the transistors 505 and 506 are coupled with each other and connected to the resistor 504.

With the above configuration, the current mirror circuit 50 is configured so that a constant-current based on the predetermined voltage V2 may be absorbed from the line L. In addition, the constant-current absorbed by the current mirror circuit 50 is set to value proportionate to the duty signal and a voltage drop caused by the constant-current is proportionate to an amplitude of the constant-current.

In the external control unit 5, the vehicle state detecting circuit 501 detects an operation state of the engine based on information such as a vehicle speed, a cooling water temperature of the engine, and an electric load.

The duty signal outputted from the duty signal generating circuit 502 corresponding to the operation state is converted to the predetermined voltage V2 by the duty-voltage conversion circuit 503.

Subsequently, the constant-current proportionate to the predetermined voltage V2 is absorbed from the line L (the output terminal of the battery 4 through the resistor 507) by the current mirror circuit 50 in the external control unit 5.

At this time, a voltage drop corresponding to a voltage deviation ΔV is caused between the input terminal 5a and the output terminal 5b of the external control unit 5 due to a current consumed by the resistor 507 in the line L.

This voltage drop allows adjustment on the battery voltage VB to be higher by the voltage deviation ΔV than the voltage at the external voltage sensing terminal S as the adjustment voltage of the voltage controlling device 1.

FIG. 3 is a diagram showing a specific example of the conversion operation by the duty-voltage conversion circuit 503.

In FIG. 3, the horizontal axis represents the duty signal (0%–100%) in the external control unit 5 and the vertical axis represents the predetermined voltage V2 and battery voltage VB (voltage deviation ΔV) after conversion, and relations therebetween are shown.

Needless to say, the set value of each voltage, the slope of the characteristic line, etc. shown in FIG. 3 can be changed easily and arbitrarily by a set specification of the current mirror circuit 50, a set resistance value of the resistor 507, or the like.

As described above, in the system for controlling a vehiclular generator according to the present invention, the external control unit 5 causing a voltage drop is inserted between the external voltage sensing terminal S and the battery 4, whereby an exclusive input terminal for an external signal can be omitted, thereby simplifying the system configuration and achieving cost reduction.

In addition, at this time, no complicated circuit is additionally required in the voltage controlling device 1 of the generator 10 for a vehicle, thereby enabling the system to combine with the voltage controlling device 1 similar to the conventional one, whereby a system for controlling electric generation, which is capable of highly precise control can be provided at low costs with ease.

The invention claimed is:

1. A system for controlling a vehicular generator, comprising:
    a voltage controlling device for adjusting a generator output voltage of a generator connected to an in-vehicle battery to a predetermined voltage,
    the voltage controlling device including an external voltage sensing terminal for detecting an external voltage of the generator, and the generator output voltage being adjusted through on/off control of a field current of the generator in accordance with the external voltage,
    characterized in that an external control unit is inserted between the external voltage sensing terminal and the battery to generate a voltage drop.

2. The system for controlling a vehicular generator according to claim 1, characterized in that:
    the external control unit includes an operation state detecting section for detecting a vehicle operation state; and
    the voltage drop is variably set in accordance with the operation state.

3. The system for controlling a vehicular generator according to claim 2, characterized in that the external control unit includes:
    an input terminal connected to the battery;
    an output terminal connected to the external voltage sensing terminal;

a duty signal generating section for generating a duty signal;

a duty-voltage conversion circuit for converting the duty signal to a predetermined voltage; and a current mirror circuit for absorbing a constant-current based on the predetermined voltage from a line between the input terminal and the output terminal.

4. The system for controlling a vehicular generator according to claim 3, characterized in that the duty signal generating section variably sets the duty signal in accordance with the operation state.

5. The system for controlling a vehicular generator according to claim 3, characterized in that:

the constant-current is set to a value proportionate to the duty signal; and the voltage drop corresponds to the constant-current.

6. The system for controlling a vehicular generator according to claim 4, characterized in that:

the constant-current is set to a value proportionate to the duty signal; and the voltage drop corresponds to the constant-current.

* * * * *